(12) United States Patent
Mishra

(10) Patent No.: US 9,594,979 B1
(45) Date of Patent: *Mar. 14, 2017

(54) PROBABILISTIC REGISTRATION OF INTERACTIONS, ACTIONS OR ACTIVITIES FROM MULTIPLE VIEWS

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/994,736

(22) Filed: Jan. 13, 2016

Related U.S. Application Data

(63) Continuation of application No. 14/548,125, filed on Nov. 19, 2014, now Pat. No. 9,262,681.

(51) Int. Cl.
| | | |
|---|---|---|
| *G06K 9/00* | (2006.01) | |
| *G06K 9/52* | (2006.01) | |
| *H04N 5/247* | (2006.01) | |
| *G06K 9/62* | (2006.01) | |
| *G06K 9/46* | (2006.01) | |
| *G06T 7/40* | (2006.01) | |
| *G06T 7/00* | (2006.01) | |

(52) U.S. Cl.
CPC ............ *G06K 9/52* (2013.01); *G06K 9/4604* (2013.01); *G06K 9/4642* (2013.01); *G06K 9/4652* (2013.01); *G06K 9/6256* (2013.01); *G06T 7/0085* (2013.01); *G06T 7/408* (2013.01); *H04N 5/247* (2013.01); *G06T 2207/20076* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,981,040 | B1 * | 12/2005 | Konig | G06F 17/30867 707/E17.109 |
| 7,120,293 | B2 * | 10/2006 | Schoelkopf | G06T 11/001 345/418 |
| 7,421,115 | B2 * | 9/2008 | Schoelkopf | G06T 11/001 345/418 |
| 7,710,247 | B2 * | 5/2010 | Sekiguchi | G06K 9/00805 340/435 |

(Continued)

*Primary Examiner* — Anand Bhatnagar
(74) *Attorney, Agent, or Firm* — Athorus, PLLC

(57) ABSTRACT

Images of an environment that are captured from two or more imaging devices may be captured and evaluated in order to identify a state of the environment, or an interaction that placed the environment in the state. The content of the images may be analyzed in order to recognize observed information or data expressed therein. The information or data may be associated with a given state according to one or more observation functions, and the state may be used to identify an action according to one or more transition functions. The observation function uses conditional probabilities to transfer the probability of making an observation by one imaging device to the observation made by the other imaging device. The observation functions and the transition functions may be derived based on historical training data including clips that are labeled to identify states or interactions expressed therein.

20 Claims, 10 Drawing Sheets

(56) References Cited

U.S. PATENT DOCUMENTS

| | | | |
|---|---|---|---|
| 8,154,578 B2 * | 4/2012 | Kurtz | G06K 9/00335 |
| | | | 348/14.01 |
| 9,094,615 B2 * | 7/2015 | Aman | G01S 3/7864 |
| 2007/0279494 A1 * | 12/2007 | Aman | G01S 3/7864 |
| | | | 348/169 |
| 2008/0063236 A1 * | 3/2008 | Ikenoue | G06K 9/32 |
| | | | 382/103 |
| 2011/0019920 A1 * | 1/2011 | Hu | G06K 9/00261 |
| | | | 382/195 |
| 2011/0060707 A1 * | 3/2011 | Suzuki | G06N 99/005 |
| | | | 706/12 |
| 2011/0060708 A1 | 3/2011 | Suzuki | |
| 2013/0158963 A1 * | 6/2013 | Brooks | G06K 9/4623 |
| | | | 703/2 |

* cited by examiner

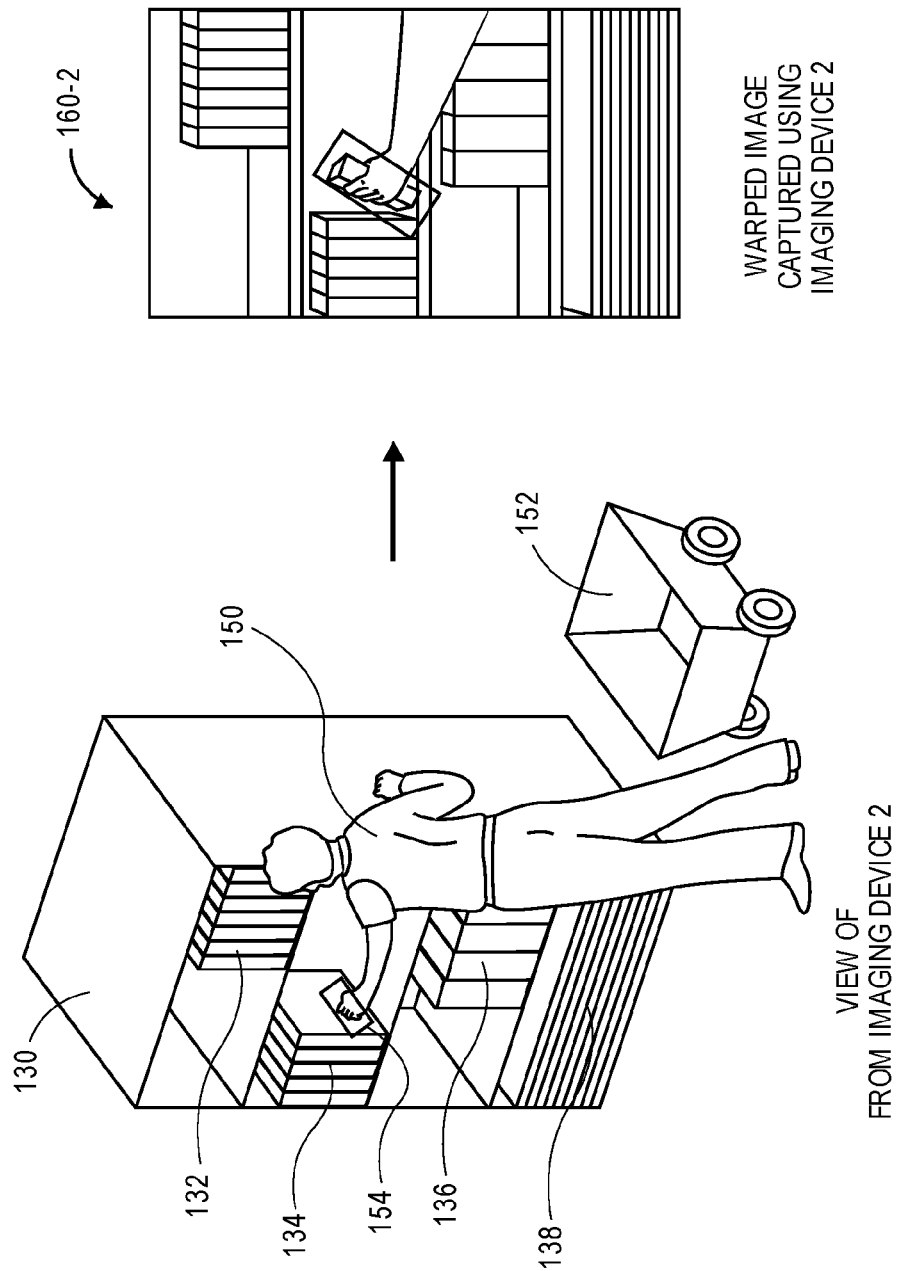

400

410 → $V(S,O) = P(O|S)$

OBSERVATION FUNCTION

ASSUME TWO IMAGING DEVICES ARE OBSERVING THE SAME STATE

420 → $P(O|S) = P(O_1|S, O_2) \cdot P(O_2) + P(O_2|S, O_1) \cdot P(O_1)$

PROBABILISTIC REGISTRATION OF INTERACTIONS, ACTIONS OR ACTIVITIES FROM MULTIPLE VIEWS

CROSS-REFERENCE TO RELATED APPLICATIONS

This application is a continuation of U.S. patent application Ser. No. 14/548,125, filed Nov. 19, 2014, the contents of which are incorporated by reference herein in their entirety.

BACKGROUND

Imaging devices such as digital cameras are frequently used in a number of security or monitoring applications in facilities such as distribution centers, parking garages or mass transit stations. For example, arrays or networks of cameras may be posted near security gates or terminals of an airport, at entryways or near focal points of a sports arena, or within or above receiving stations, storage areas or distribution stations of a fulfillment center or other distribution facility. Because imaging devices have decreased in cost and increased in quality in recent times, large numbers of such devices may be deployed in such facilities, enabling the capture, analysis or storage of still or moving images, or other information or data, regarding interactions, actions or activities occurring at, near or within such facilities.

Presently, many detection systems provided in such facilities typically include a plurality of individual imaging devices, e.g., monocular view digital cameras, for the purpose of detecting, recognizing and classifying interactions, actions or activities occurring within their respective fields of view. The efficacy of such systems may be limited, however, by occlusions, obstructions or other cluttering within the fields of view of the respective imaging devices. For example, where a warehouse or similar facility includes an array of digital cameras mounted above or around a number of shelves, bays or racks that are frequented by any number of personnel or autonomous mobile robots, the internal infrastructure of the facility may prevent a complete view of each of the various interactions, actions or activities between such personnel or robots and such shelves, bays or racks from being captured by the various cameras, which may thereby result in high numbers of false positive detections, or low numbers of accurate detections, of the interactions, actions or activities.

Attempts to address the problems created by occlusions or cluttering within fields of view of such cameras have achieved varying degrees of success. For example, some detection systems have incorporated stereo cameras having two or more lenses and sensing components, with parallel or converging camera axes, thereby enabling such systems to capture interactions, actions or activities from multiple perspectives and make determinations as to ranging or other attributes of such interactions, actions or activities from such perspectives. Stereo camera systems require frequent calibration, however, and may be limited in the same manner with regard to occlusions or cluttering within the fields of view of the respective lenses and/or sensors. Similarly, some other detection systems have included range cameras, e.g., depth sensors which project infrared or other invisible light off of surfaces and detect the reflected infrared or invisible light from such surfaces, to obtain depth data regarding objects within their fields of view, and to utilize such depth data when classifying interactions, actions or activities occurring therein. However, using depth data to detect interactions, actions or activities is complicated and error-prone, as such determinations require one or more depth models to be generated based on the depth data, and the depth models must be then analyzed in order to recognize all or portions of the objects or humans within such fields of view and to recognize and classify any interactions between them.

BRIEF DESCRIPTION OF THE DRAWINGS

FIGS. 1A through 1D are views of aspects of one system for probabilistically registering interactions, actions or activities in accordance with embodiments of the present disclosure.

DETAILED DESCRIPTION

As is set forth in greater detail below, the present disclosure is directed to the probabilistic registration of interactions, actions and activities using imaging data captured from multiple views. More specifically, the present disclosure is directed to robust and scalable systems and methods which utilize multiple imaging devices to capture imaging data within an active environment in states that may be changed in response to any number of interactions, actions or activities. Imaging data captured by such devices may be evaluated to identify the visual features expressed therein and determine probabilities that the devices have observed the active environment in two or more states at different times, and to predict, on a probabilistic basis, a state that is observed within the imaging data, and the interaction, the action or the activity that caused the state to change. Using one or more statistical models, including one or more probabilistic models based on Bayes's Theorem, the systems and methods disclosed herein may thus be utilized to identify a most likely interaction that resulted in a change from a first state to a second state, based on the imaging data captured from two or more imaging devices.

Figure 1A:
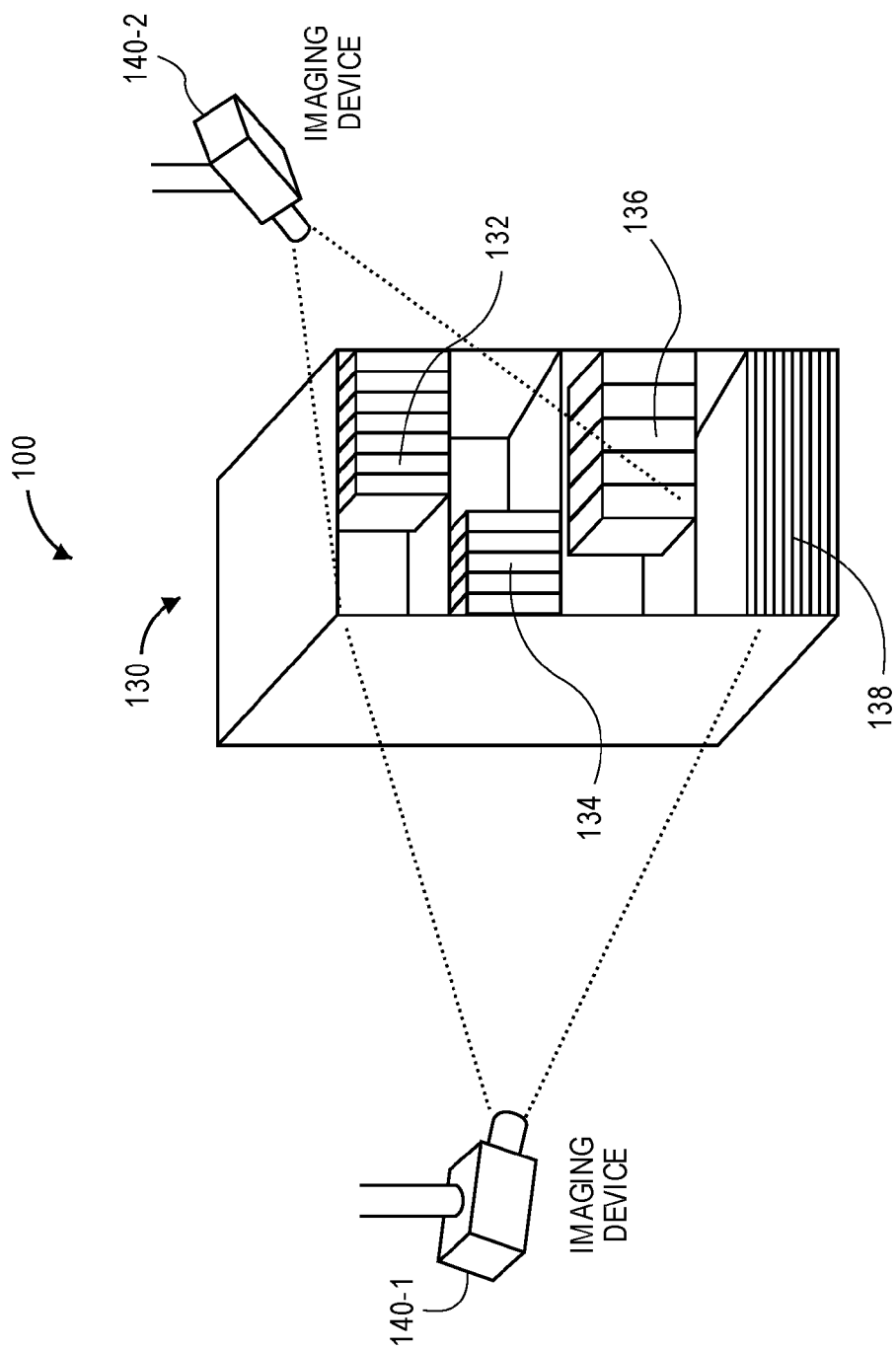

Referring to FIG. 1A, a system 100 for probabilistically registering interactions, actions or activities in accordance with embodiments of the present disclosure is shown. The system 100 includes a storage area 130 having a plurality of items 132, 134, 136, 138 disposed thereon, and a pair of imaging devices 140-1, 140-2 that include the storage area 130 within a field of view. The storage area 130 shown in FIG. 1A may be any fixed or mobile set of shelves, bays, bins, slots or other receptacles for receiving the items 132, 134, 136, 138 therein or thereon. The items 132, 134, 136, 138 may be any types of goods or products that may be accommodated in the storage area 130. The imaging devices 140-1, 140-2 may be any type or form of optical machine, e.g., a digital camera, for capturing imaging data regarding an active environment. The imaging data may include any type or form of information or data, e.g., still or moving digital imagery, captured from an active environment. As is shown in FIG. 1A, the imaging device 140-1 is mounted in a substantially oblique configuration with respect to a front face of the storage area 130, and at a particular altitude or elevation, while the imaging device 140-2 is mounted in a substantially fronto-parallel configuration with respect to the front face of the storage area 130, and at a higher altitude or elevation.

Figure 1B:
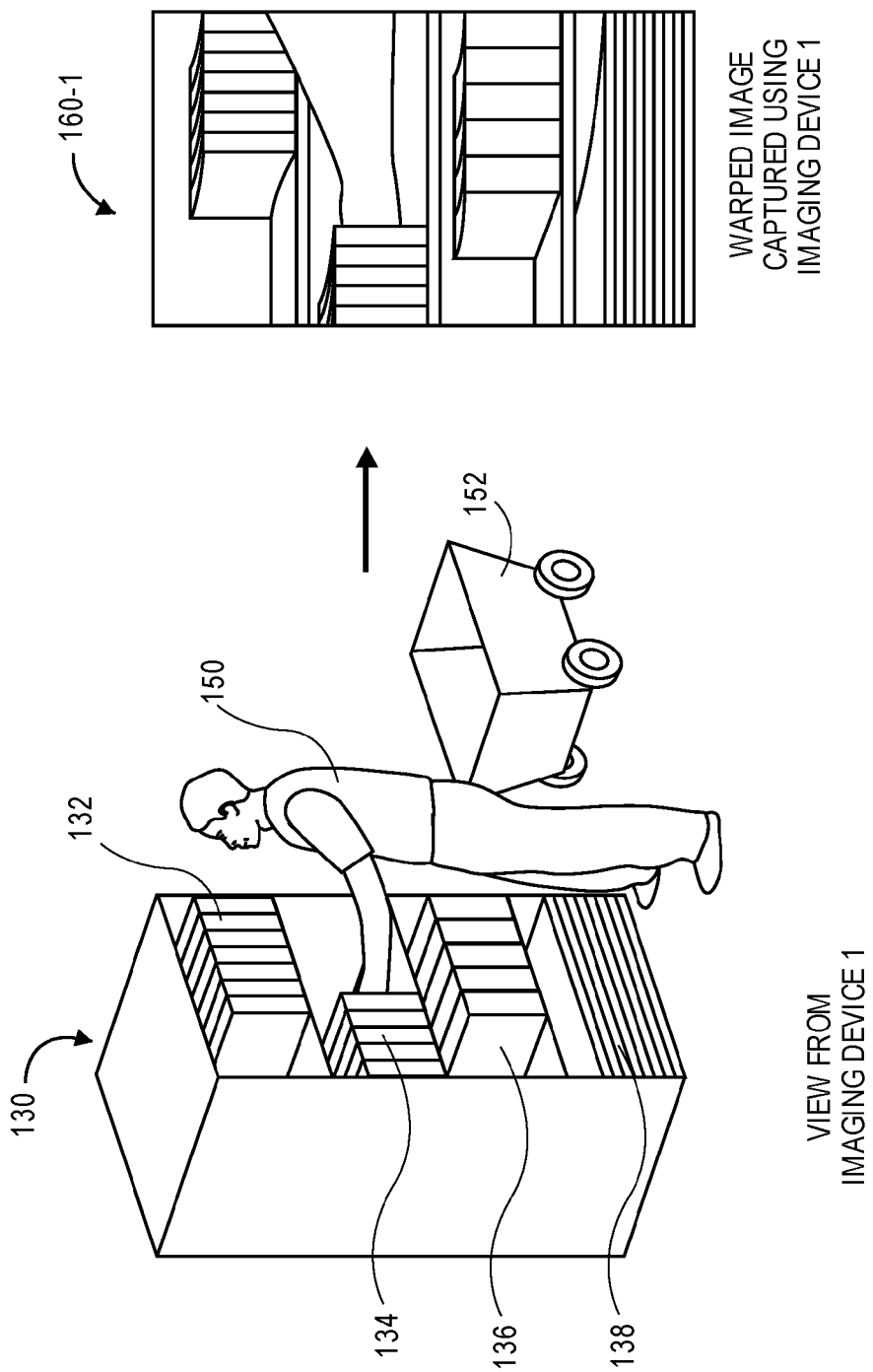

As is discussed above, the systems and methods of the present disclosure may be utilized to probabilistically determine, based on imaging data captured using two or more imaging devices, a state of a given environment and an interaction that caused the state of the given environment to change. Referring to FIG. 1B, a view of the storage area 130 from a perspective of the imaging device 140-1, and an image 160-1 captured using the imaging device 140-1 are shown. The view of the storage area 130 shown in FIG. 1B includes a worker 150 and a cart (e.g., a tote) 152. The worker 150 is shown as reaching into the storage area 130 and potentially interacting with one or more of the items 132, 134, 136, 138 therein. Because at least a portion of a hand of the worker 150 is obscured within the field of view of the imaging device 140-1, it is difficult to determine what the worker 150 is doing from the perspective of the imaging device 140-1. The image 160-1 is digitally manipulated, or warped, from the perspective of the imaging device 140-1 to simulate a substantially flat depiction as shown in FIG. 1B. This substantially flat depiction may be any pre-determined and fixed image onto which the storage area 130 from the perspective of the imaging device 140-1 is warped using a geometrical transform.

Referring to FIG. 1C, a view of the storage area 130 from a perspective of the imaging device 140-2, and an image 160-2 captured using the imaging device 140-2, are shown. Because the imaging device 140-2 is mounted in a substantially fronto-parallel manner with respect to the front face of the storage area 130, the worker 150 obscures much of the front face of the storage area 130 within the field of view of the imaging device 140-2. However, the imaging device 140-2 shows an item 154 within a hand of the worker 150, as is expressed in the image 160-2.

Figure 1D:
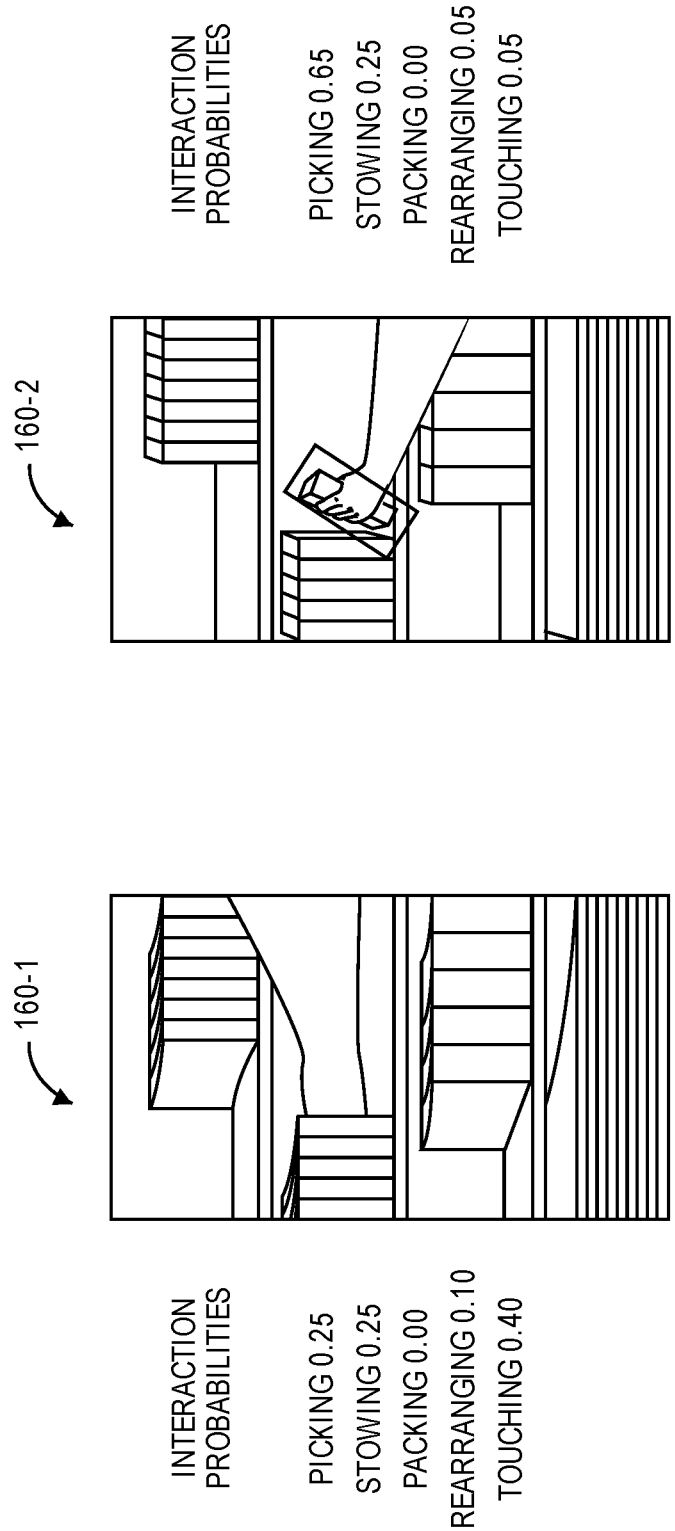

As is discussed above, a most likely interaction occurring within an active environment may be identified from imaging data captured using two or more imaging devices, which may be analyzed to determine probabilities that a given state is expressed therein, or that a given action is occurring. For example, the accuracy of a probability that imaging data captured from each of the imaging devices describes a particular interaction may be enhanced using the imaging data captured from other imaging devices, according to one or more statistical models, such as models which operate according to Bayes's Theorem. Referring to FIG. 1D, the images 160-1, 160-2 captured using the imaging devices 140-1, 140-2, as is shown in FIGS. 1B and 1C, are shown. Probabilities that the respective images 160-1, 160-2 reflect a given interaction, action or activity are shown in FIG. 1D.

For example, based on the image 160-1, there is a probability of 0.25 (or twenty-five percent) that the image 160-1 indicates an interaction of picking an item from the storage area 130, and a probability of 0.25 (or twenty-five percent) that the image 160-1 indicates an action of stowing an item in the storage area 130. More particularly, it is equally likely that the image 160-1 indicates an action of picking or stowing. As is also shown in FIG. 1D, there is a probability of 0.00 (or zero percent) that the image 160-1 indicates an action of packing an item, and probabilities of 0.10 and 0.40 (or ten percent and forty percent, respectively) that the image 160-1 indicates an interaction of rearranging an item or touching an item, respectively.

Likewise, based on the image 160-2, which includes a view of the item 154, there is a probability of 0.65 (or sixty-five percent) that the image 160-2 indicates an interaction of picking an item from the storage area 130, along with probabilities of 0.25, 0.00, 0.05 and 0.05 (or twenty-five percent, zero percent, five percent and five percent, respectively), that the image 160-2 indicates actions of stowing, packing, rearranging or touching items, respectively. Using the individual probabilities that imaging data captured using two or more imaging devices, e.g., the imaging devices 140-1, 140-2 of FIGS. 1A through 1C, includes an observation of an active environment in a given state, e.g., the images 160-1, 160-2 of FIGS. 1B through 1D, the probability that an interaction causing a change in the state is expressed within the imaging data may be enhanced in accordance with the present disclosure.

Many types of computer-based systems are provided in high-traffic environments such as office buildings, stadiums or arenas, transportation centers or warehouses or other like facilities for the purpose of capturing information or data regarding any interactions, actions or activities occurring within the environments. For example, in a modern fulfillment center associated with an online marketplace, hundreds of inbound shipments of items may be received each hour, and the items therein may be unloaded at a receiving station, placed into storage in a storage area or transported to a distribution station in preparation for delivery to one or more customers. Similarly, when an order for one or more of the items at the fulfillment center is received via the online marketplace, the items may be retrieved from their locations within the fulfillment center and transported to the distribution station and prepared for delivery. Items may be received, stored, transported, prepared or packed into one or more containers by humans or machines, or by a combination of one or more humans and one or more machines.

Some computer-based systems and methods for tracking interactions between humans and/or machines within such environments include the use of contact-based features (e.g., consoles or panels including one or more depressible buttons or operable switches), or scanning or reading components (e.g., optical scanners for interpreting bar codes or other markings). For example, when a worker unloads a container arriving in an inbound shipment from a delivery vehicle, the worker may scan one or more bar codes on an external surface of the container using a hand-held device or other reader, and one or more decoded signals identifying the container or any items therein to a networked computer system. When another worker prepares to deposit the container or one or more items therein in a designated space at a storage area within the fulfillment center, the worker may again scan a bar code or other identifier on the container or the items, and another bar code or identifier on the designated space (e.g., on a shelf, a bar or a rack), or depress one or more buttons on an input device or computer interface at the designated space, and indicate that he or she has deposited the item at the designated space.

Existing systems or methods for registering interactions, actions or activities with a computer system based on contact with a button or switch, or by scanning or reading a bar code or other marked identifier on an object, may be prone to errors for any number of reasons. For example, because such systems or methods rely on physical contact by one or more workers, the various components required to register such interactions, actions or activities occurring within an environment in which such systems or methods are provided may be adversely affected by conditions within the environment, e.g., mechanical vibrations, dirt, moisture, or other debris, which may foul one or more depressible buttons or operable switches, or obscure a marked identifier such as a bar code or a set of text provided on an object.

Further, such systems and methods may be slow or inefficient, as the systems and methods necessarily rely on several steps or actions to be taken by one or more humans, and the interpretation of such steps or actions by one or more computing devices or systems. The steps or actions to be taken, e.g., retrieving a handheld scanner or other device, and scanning one or more bar codes or other marked identifiers using the scanner or device, or depressing one or more buttons or switches on the scanner or other device, are neither naturally ergonomic nor optimal, and may be time-consuming or may occupy a substantial amount or extent of the available processing power on the one or more computing devices or systems. Additionally, handheld devices or computer interfaces such as scanners, readers, keyboards, pointing devices or other computer-based components including electrical or mechanical components frequently require hardware maintenance, software upgrades or technical support to ensure that the components are functioning properly.

Moreover, existing systems or methods which rely on scanners or readers, or one or more depressible buttons or switches, to register interactions, actions or activities are typically limited to a particular set of pre-defined interactions, actions or activities associated with a marked object, or involving a button or switch, such as placing an item into a bin or onto a shelf, or removing an item from the bin or the shelf. Interactions, actions or activities which are not associated with a marked object or do not involve a button or switch, such as checking or rearranging the contents of the bin or the shelf, cannot be registered by such systems or methods.

Many imaging devices, such as digital cameras, operate by capturing light that is reflected from objects, and subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces. Furthermore, outlines of objects expressed in a digital image may be identified using one or more algorithms or machine-learning tools. Some such algorithms or tools may recognize edges, contours or outlines of objects in a digital image, or of portions of objects in the digital image, and may match the edges, contours or outlines of the objects against information regarding edges, contours or outlines of known objects, which may be stored in one or more data stores.

The use of large networks of digital cameras or other imaging devices for monitoring active and open environments such as those in a fulfillment center, a stadium or a public space (e.g., a transportation center, a shopping mall or a park) is increasingly common, based at least in part on not only the reduced costs of purchasing such devices but also the increased capacity of wired or wireless data networks to accommodate data that may be captured by such devices, including but not limited to still or moving images and associated content. Like any other camera or imaging device, however, the cameras or other imaging devices provided in such a network may be subject to anomalies which may adversely impact the quality of the images or other imaging data that may be captured thereby.

The present disclosure is directed to novel, robust and scalable systems and methods for automatically registering interactions, actions or activities occurring within a monitored environment, e.g., between one or more humans, robots, structures or facilities within a fulfillment center. Such systems and methods utilize multiple imaging devices that are aligned to capture imaging data from a common scene, and analyze the imaging data to identify and confirm the specific interactions, actions or activities occurring therein. Because registering interactions, actions or activities within the common scene with sufficient certainty using imaging data captured from a single imaging device is infeasible, the systems and methods disclosed herein incorporate multiple imaging devices, e.g., two or more cameras, with different perspectives of the common scene.

Rather than attempting to reconstruct structures or depths in three dimensions using two-dimensional imaging data captured from one or more imaging devices, and determining whether any interactions, actions or activities occurred within their respective fields of view based on the reconstructed depths or structures, the systems and methods disclosed herein determine the probabilities that such interactions, actions or activities occurred within the field of view of one imaging device based on imaging data captured thereby and project such probabilities onto imaging data that was captured within the field of view of another imaging device, and vice versa, in order to enhance the accuracy of a determination as to whether and which interaction, action or activity occurred within the respective fields of view of each of the imaging devices.

In accordance with the present disclosure, a probabilistic approach may be used to determine whether or which interactions, actions or activities occurred within the fields of view of two or more imaging devices, e.g., digital cameras configured to capture still or moving images from a common scene. The probabilistic approach may take into account one or more occlusions, obstructions or elements of clutter visible within the fields of view of one or more of the imaging devices. According to some embodiments, the probabilistic approach may utilize one or more mathematical models of decision-making processes, such as partially observable Markov Decision Processes or like techniques, based on observations occurring within video and image sequences. One or more optical flow fields between frames of one view are projected over regions in cells, or areas within warped images, and the resulting projections are temporally integrated according to a probabilistic graphical model such as a dynamic Bayesian network. Using the probabilistic model, the systems and methods of the present disclosure may project one or more optical flow fields, or any spatial changes in pixels between disparate multiple views, in order to detect and predict any interactions, actions or activities occurring within the fields of view based on the probabilities which are enhanced using imaging data captured from other fields of view.

Some embodiments of the present disclosure operate in two distinct phases, e.g., a training phase, in which one or more classifiers are programmed to recognize states and interactions using labeled imaging sequences, as well as an operational phase, in which the trained classifiers are used to recognize states and interactions based on analyses of imaging data captured using two or more imaging devices according to observational and transition functions defined using the trained classifiers. For example, the training phase may consider imaging sequences (e.g., still or moving imagery) that have been labeled to indicate the various states or interactions of a given environment expressed therein, from multiple views and from multiple imaging devices. Where the systems and methods disclosed herein are provided in a fulfillment center environment, some such states may relate to the position or presence of an item in an affirmative or negative fashion, e.g., "item on shelf," "item in cart," "item not on shelf" or "item on floor," while some such interactions may include various actions taken with regard to receiving, storing, retrieving or distributing items, e.g., "picking," "stowing," "packing," "rearranging," "touching," and the like.

The labels of the imaging sequences thus comprise a complete set of parameters that may be used to define the observation function and the transition function. For example, where the systems and methods of the present disclosure are utilized in a fulfillment center environment, the labeled imaging sequences may comprise still images, video clips or other video data files of discrete lengths which correspond to interactions such as picking, stowing, packing, rearranging or touching items within a fixed or mobile storage facility, e.g., a stationary shelf or a moving cart. From such imaging sequences, the visual features, such as histograms of oriented gradients and/or color histograms, which imply each of the states or actions are identified from the perspectives of each of the imaging devices. For example, where a first state of a storage facility having a bright yellow color is "vacant," and a second state of the storage facility is "item inside storage facility," then color histograms of images of the storage facility in either state that are captured using two or more imaging devices may be calculated.

Next, an observation function, e.g., a formula for calculating the probability that an environment is observed in a given state, or $P(O|S)$, by one or both of the imaging devices, is calculated for each of the states using the labeled training data. In accordance with the present disclosure, the use of two or more imaging devices to calculate the probability effectively determines probability distributions for particular regions within a camera view that may be reliably used to determine whether a given state is observed. Because each of the imaging devices may have regions within their fields of view that contribute more to an overall probability that the state will be determined, the probability that the state will be observed by at least one of the imaging devices is enhanced.

Finally, a transition function, e.g., a probability that a subsequent state is observed given a previous state and an interaction, is also learned based on the labeled training data. For each of a known set of interactions, the probability that an interaction will result in a change of state from a first state to a second state may be determined. For example, a probability that a picking action will cause a change from a first state, such as "item inside bin," to a second state, such as "item not inside bin," is substantially high. Likewise, the probability that a packing interaction will cause a change from a state of "item inside bin" to a state of "item not inside bin" is not high. The transition function represents the relationship between two states for a given interaction.

Once the observation function and the transition function are derived based on labeled training data, the occurrences of interactions within the active environment may be registered using two or more imaging devices, e.g., to derive the most likely change that occurred within the observed visual features across all views for a change in state as a result of a given interaction. According to some embodiments of the present disclosure, imaging data may be processed in order to identify visual features such as histograms of oriented gradients and/or color histograms expressed therein based on pixel data or statistics from each camera view. Next, the observation function may be calculated based on the observed visual features such as color histograms for each potentially current state, or $P(O|S_{current})$, based on the probability that the potentially current state was observed by each of the imaging devices. In parallel, a probability that each of the potentially current states exist, or $P(S_{current})$, is determined based on a probability distribution for a previous state, or $P(S_{previous})$, and a possible interaction, a.

According to some embodiments, the systems and methods disclosed herein may be provided to monitor the interactions between a human and an autonomous mobile robot. At least one imaging device is preferably aligned to cover an entire frontal face of the robot and have sufficient resolution and clarity in order to capture imaging data regarding the robot and one or more of the bins or spaces carried thereon, and the contents of such bins or spaces. At least one imaging device is preferably free of occlusions or obstructions of the views of the bins or spaces. At least one imaging device is preferably configured to capture imaging data and identify one or more items associated with an interaction, an action or an activity.

For example, one embodiment of the present disclosure may include a first digital camera having a substantially fronto-parallel view of a targeted environment, e.g., an accessible face of one or more bins moved by an autonomous mobile robot, which may be subjected to a number of occlusions or obstructions, and a second digital camera having an oblique view of the targeted environment, which may be subjected to fewer occlusions or obstructions. Images or other imaging data corresponding to the accessible face of one or more bins moved by the autonomous mobile robot may be warped to an image patch, or a cell image, having fixed dimensions. The warping of the images or imaging data to the image patch or cell image may be conducted using one or more homographic techniques that may define the mapping of points, lines, or geometrical areas expressed in one image onto a plane of another image. The warping of the images to the fixed image patch enables the contents of each of the images to be effectively compared to one another using one or more probabilistic graphical models. Such models may enable the various distinct interactions, actions or activities between or involving the accessible face of one or more bins moved by the autonomous mobile robot to be detected and distinguished from one another based on the net effects expressed in the fixed image patch. For example, using images or imaging data captured from two or more imaging devices and warped to a common image patch, various worker interactions with one or more bins, such as the picking of an item from a location and the placement of the item into the bin, the removal of an item from a bin and the stowage of the item in a storage area, the manual evaluation of the contents of a bin, or the exchanging of pods or other receptacles moved by a robot, may be recognized and identified.

As is referenced above, the systems and methods of the present disclosure may utilize one or more probabilistic or statistical models to combine information obtained through images or imaging data captured from two or more imaging devices regarding a targeted environment, including conditional probabilities associated with one or more aspects of the targeted environment, and to detect and classify interactions, actions or activities expressed in the images or the imaging data. According to some embodiments of the present disclosure, a dynamic Bayesian network may be defined to represent the conditional probability that a given interaction, action or activity is expressed in a set of images or imaging data that are warped to a fixed image patch, and the conditional probabilities of each of the interactions, actions or activities may be combined and transferred to another set of images or imaging data. Such dynamic Bayesian networks may infer the existence or occurrence of an interaction, an action or an activity based on evidence of a state of an environment as reflected in imaging data captured by two or more imaging devices.

Some embodiments may utilize or train a Bayesian classifier or other form of machine learning algorithm to determine a probability that a set of imaging data includes an observation of an area in a given state. Bayesian classifiers operate based on Bayes's Theorem, and are particularly appropriate where an input has a high degree of multi-dimensionality, e.g., a set including information regarding a large number of states or interactions causing changes between the states. As is recognized by those of skill in the art, Bayes's Theorem links conditional probabilities to their respective inverses, and is commonly written as follows:

$$P(A|B) = \frac{P(B|A) \cdot P(A)}{P(B)}$$

where $P(A|B)$ is defined as the conditional probability of A, given B; where $P(B|A)$ is defined as the conditional probability of B, given A; and where $P(A)$ and $P(B)$ are the marginal probabilities of A and B, respectively.

A Bayesian classifier may be used to identify particular correlations of observations of an active environment in a given state by two or more imaging devices, based on any information that may be provided or available regarding the active environment or the states. When using a Bayesian classifier, the variables entered into the classifier may be expanded to include all available possibilities of states or observations from a given imaging device. In addition to Bayesian classifiers, any other systems or methods for machine learning or computational learning, such as artificial neural networks or regression techniques, may be utilized in accordance with the present invention to determine whether an observation is made by two or more imaging devices.

Additionally, according to the law of total probability, the probability that a given observation is observed from two or more imaging devices in a given state may be determined as a weighted average of the conditional probabilities that the given observation was observed from each of the imaging devices. For example, where two imaging devices are provided to monitor an active environment, the probability that an observation O of the environment in a given state S is made, or P(O|S), may be calculated according to the following equation:

$$P(O|S)=P(O_1|S,O_2)\cdot P(O_2)+P(O_2|S,O_1)\cdot P(O_1)$$

where $P(O_1|S,O_2)$ is the probability that the observation $O_1$ is made by a first imaging device given the state S and the observation $O_2$ by a second imaging device, where $P(O_2)$ is the probability of the observation $O_2$ by the second imaging device, where $P(O_2|S,O_1)$ is the probability that the observation $O_2$ is made by the second imaging device given the state S and the observation $O_1$ by the first imaging device, and where $P(O_1)$ is the probability of the observation $O_1$ by the first imaging device. The conditional probabilities $P(O_1|S,O_2)$ and $P(O_2|S,O_1)$ may be referred to as transfer probabilities, as each transfers the probability of making an observation in one view given the state S and an observation in the other view. Likewise, a transition function, $P(S_{current}|S_{previous}, a)$ may be calculated based on a probability that a given current state is present, or $S_{current}$, given that a given previous state $S_{previous}$ was observed, and given that an interaction a has occurred.

Figure 2:
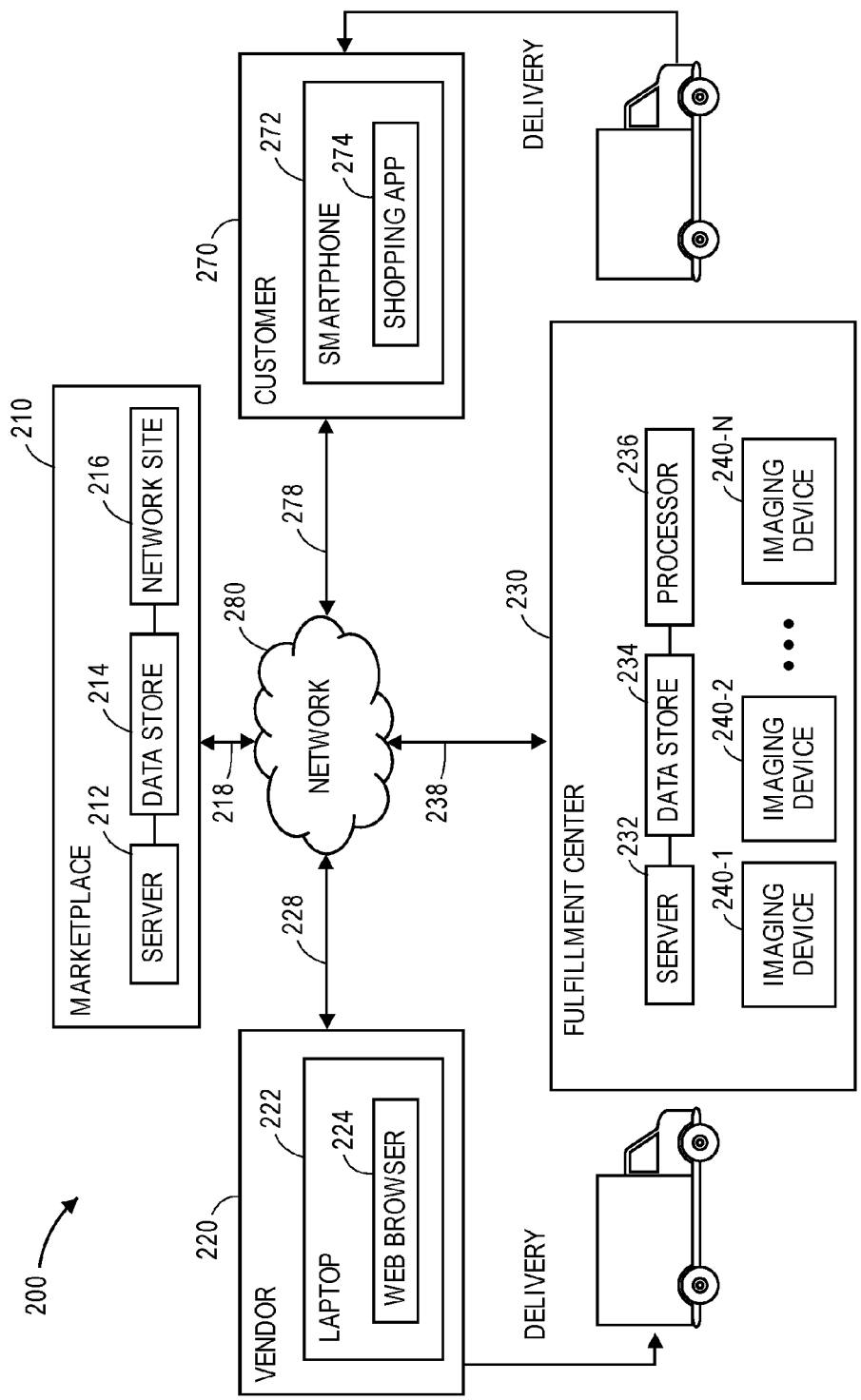
FIG. 2 is a block diagram of components of one system for probabilistically registering interactions, actions or activities in accordance with embodiments of the present disclosure.

Referring to FIG. 2, a block diagram of components of one system 200 for probabilistically registering interactions, actions or activities in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data stores 214 may contain any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 226, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes n imaging devices 240-1, 240-2 . . . 240-n.

The imaging devices 240-1, 240-2 . . . 240-n may comprise any form of optical recording device that may be used to photograph or otherwise record images of structures, facilities or other elements within the fulfillment center 230, as well as the items within the fulfillment center 230, or for any other purpose. Such imaging devices 240-1, 240-2 . . . 240-n may capture one or more still or moving images, as well as any relevant audio signals or other information, within one or more designated locations within the fulfillment center 230, and may be connected to the server 232 or with one another by way of an internal network (not shown). Additionally, the imaging devices 240-1, 240-2 . . . 240-n may be adapted or otherwise configured to communicate with one another, or with the marketplace 210 or the marketplace server 212, the vendor 220 or the vendor laptop 222 or the customer 270 or customer smartphone 272, or to access one or more other computer devices by way of the external network 280, over the internal network. Although the fulfillment center 230 of FIG. 2 includes three boxes corresponding to imaging devices 240-1, 240-2 . . . 240-n, any number or type of imaging devices may be provided in accordance with the present disclosure, including but not limited to digital cameras or other optical sensors.

The fulfillment center 230 may further operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the imaging devices 240-1, 240-2 . . . 240-n. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center" or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including E-mail or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232 or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of imaging devices, e.g., digital cameras, deployed in an array or network within a fulfillment center environment, the systems and methods are not so limited. Rather, the systems and methods disclosed herein may be utilized in any environment in which the monitoring of the operation of any number of imaging devices is desired.

Figure 3:
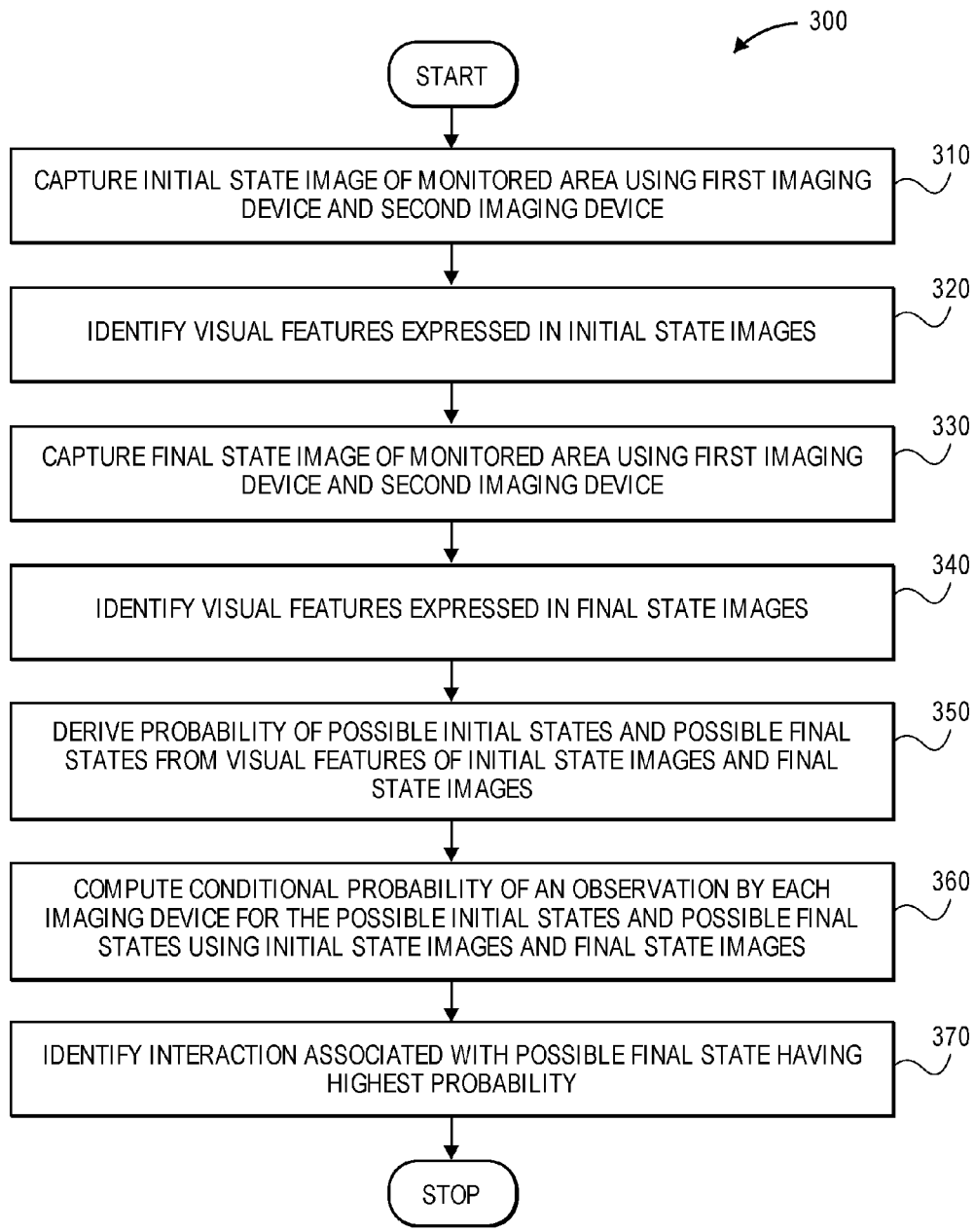
FIG. 3 is a flow chart of one process for probabilistically registering interactions, actions or activities in accordance with embodiments of the present disclosure.

Referring to FIG. 3, a flow chart 300 representing one embodiment of a process for probabilistically registering interactions, actions or activities in accordance with embodiments of the present disclosure is shown. At box 310, initial state images are captured from a monitored area using a first imaging device and a second imaging device. For example, referring to the system 100 of FIGS. 1A through 1D, images of the storage area 130 in an initial state may be captured using each of the imaging devices 140-1, 140-2. At box 320, the visual features expressed in each of the initial state images may be identified. For example, a color histogram may be performed on each of the images to identify any barriers or boundaries between colors that may be indicative of the initial state, e.g., an item in a storage facility. Alternatively, any other form of analysis may be conducted to identify one or more aspects of the initial state images captured using each of the first imaging device and the second imaging device which might be indicative of the initial state. Similarly, at box 330, final state images of the monitored area are captured using the first imaging device and the second imaging device, and at box 340, the visual features expressed in the final state images are identified.

At box 350, probabilities of the observations of the possible initial states and the possible final states are derived based on the visual features observed in the initial state images and the final state images. For example, the probability that a given state is observed within either the initial state images or the final state images may be determined based on the color histograms identified in each of the images according to an observation function that is derived on any basis. As is discussed above, an observation function may be derived based on labeled video sequences and known sets of states and/or interactions, and may represent the probability distributions for regions within a specific camera view that may be used in order to reliably observe given states therefrom. At box 360, a conditional probability that an observation is made by either of the imaging devices is calculated for each of the possible initial states and the possible final states using the information identified from the initial state images and the final state images. The conditional probabilities may be determined based on the visual features from the images captured from each of the fields of view of the imaging devices to one another.

At box 370, an interaction associated with a possible final state having a highest probability is determined, and the process ends. For example, an interaction that was most likely to result in one of the possible final states having the highest probability of having been observed by one or both of the first imaging device or the second imaging device, as determined based on an observation function, may be identified as the interaction that has most likely occurred.

Figure 4:
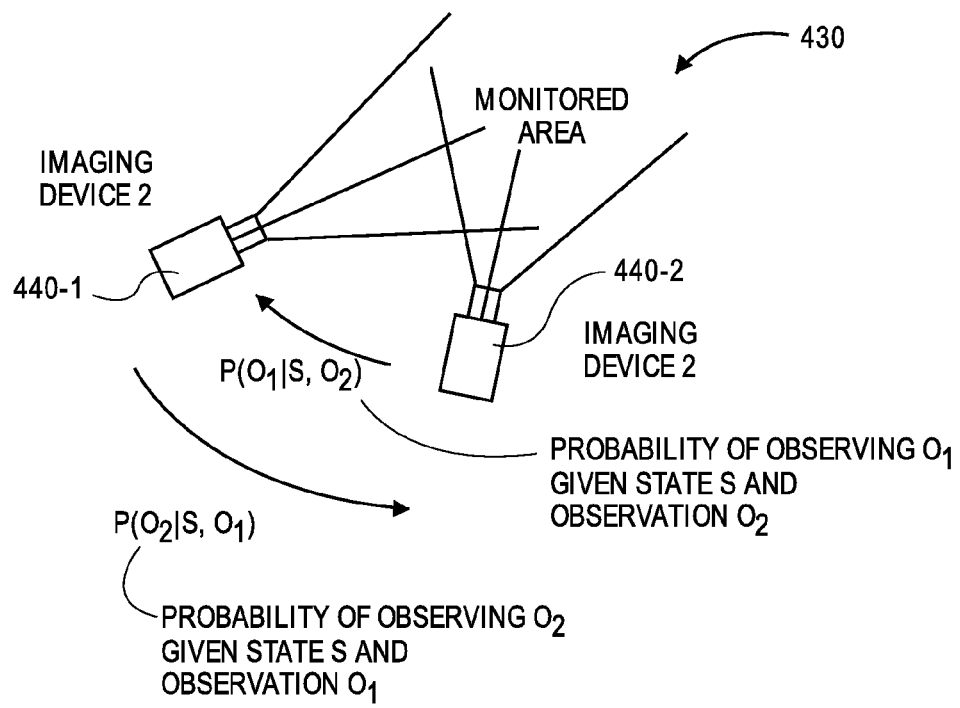
FIG. 4 is a view of aspects of one system for probabilistically registering interactions, actions or activities in accordance with embodiments of the present disclosure.

As is discussed above, the systems and methods are directed to identifying information regarding states as expressed within imaging data captured using two or more imaging devices according to an observation function that effectively expresses the probability distributions for regions within a field of view for a given imaging device that can reliably capture information for a given state. Referring to FIG. 4, aspects of one system 400 for probabilistically registering interactions, actions or activities in accordance with embodiments of the present disclosure are shown. The system 400 includes a monitored area 430 and a pair of imaging devices 440-1, 440-2 configured to include the monitored area 430 within their respective fields of view.

In accordance with the present disclosure, the system 400 utilizes an observation function 410, viz., V(S,O)=P(O|S), that expresses a probability that an observation O by two or more imaging devices includes a given state S. In particular, the observation function 410 may be calculated according to a Bayesian classifier 420, viz., $P(O|S)=P(O_1|S,O_2) \cdot P(O_2) + P(O_2|S,O_1) \cdot P(O_1)$, where the probability that the observation O of either or both of two imaging devices includes a given state S is calculated as a sum of the product of the conditional probabilities with the observation probabilities; $P(O_1|S,O_2)$ is the conditional probability of making observation $O_1$ by the first imaging device given the state S and the observation $O_2$ by the second imaging device and $P(O_2)$ is the probability of making observation $O_2$. $P(O_2|S,O_1)$ is the conditional probability of making observation $O_2$ by the second imaging device given the state S and the observation $O_1$ by the first imaging device and $P(O_2)$ is the probability of making observation $O_2$. As is discussed above, $P(O_1|S, O_2)$ and $P(O_2|S,O_1)$ may also be called transfer probabilities, as each transfers the probability of making an observation in one view given the state S and an observation in another view. Transferring such probabilities from a view of one imaging device to another view of another imaging device assists in computing the probability that an observation O is made by two or more imaging devices for a given state S.

Thus, the probability that a given state is observed by one or more of a plurality of imaging devices may be determined according to one or more statistical models, e.g., a Bayesian classifier, that are trained using labeled imaging data including sets of states and actions, and considers information regarding the state that is available from each of the imaging devices.

Figure 5:
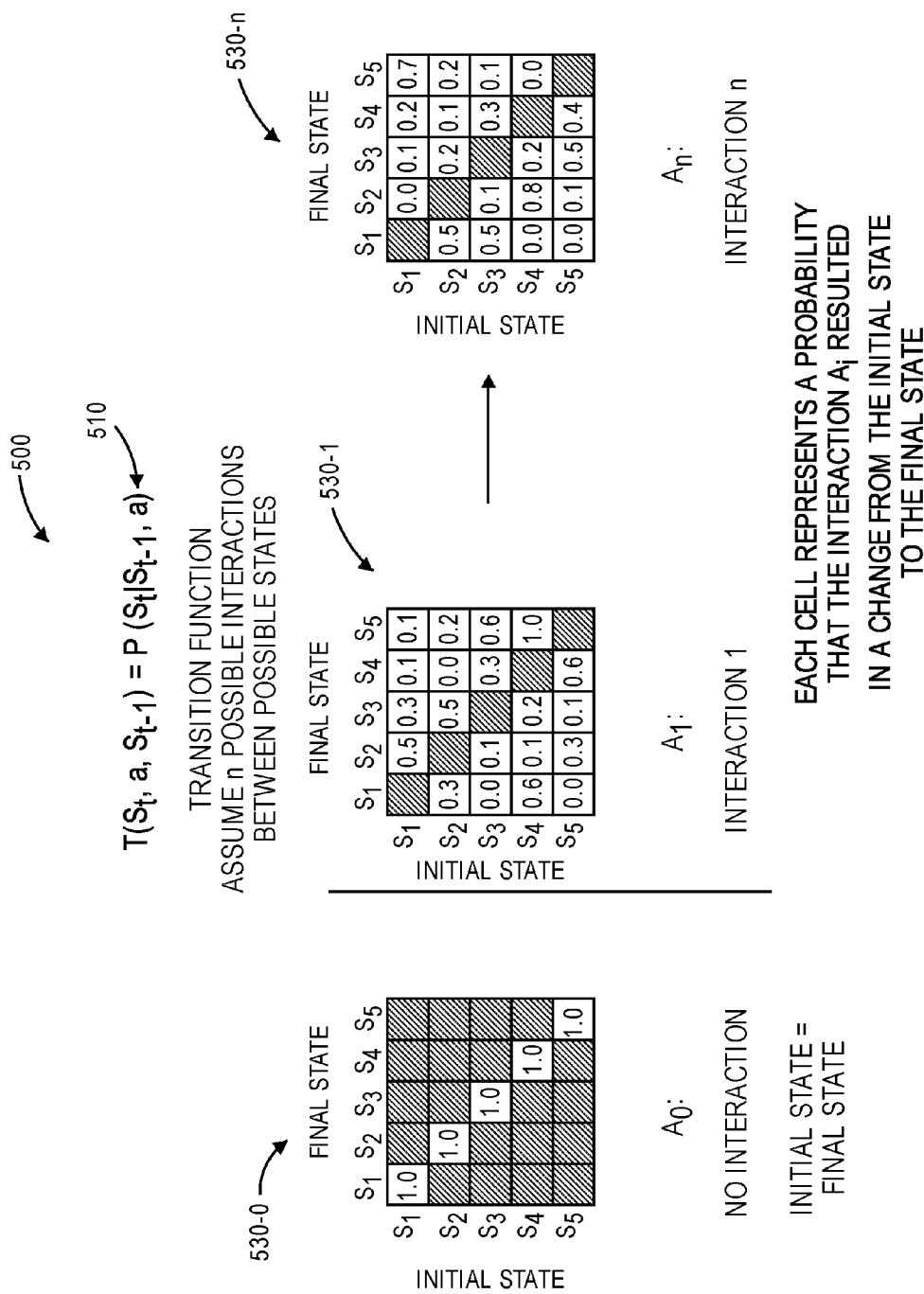
FIG. 5 is a view of aspects of one system for probabilistically registering interactions, actions or activities in accordance with embodiments of the present disclosure.

Additionally, one or more other statistical models may be trained using the labeled imaging data to identify probabilities that a given interaction will result in a change from a first state to a second state. Referring to FIG. 5, aspects of one system 500 for probabilistically registering interactions, actions or activities in accordance with embodiments of the present disclosure are shown. The system 500 includes a transition function 510 for calculating the probability that a current state, $S_t$, is present given a previous state, $S_{t-1}$, and an interaction A, for each of a plurality of n interactions. The system 500 shown in FIG. 5 further includes a plurality of (n+1) arrays 530-0, 530-1 ... 530-n. The array 530-0 represents the probability that an initial state results in a final state where no interaction has occurred, while the arrays 530-1 . . . 530-n correspondingly represent probabilities that initial states result in final states where a given interaction $A_i$ has occurred.

The probabilities expressed in the various arrays 530-0, 530-1 . . . 530-n may be derived based on the labeled imaging data, e.g., through prior observations captured by a plurality of imaging devices and stored in a series of clips or other video data files that are associated with a given state and/or a given interaction. Some of the observations may be highly likely to have been observed, e.g., for an interaction corresponding to the picking of an item from a shelf or other storage facility, a first set of images may include a plurality of pixels corresponding to a colored object on the shelf or within the facility captured from one or more imaging devices, as well as a second set of images indicating that the colored object is no longer on the shelf or within the facility, e.g., characterized by the absence of the plurality of pixels. In this regard, the arrays 530-0, 530-1 . . . 530-n may be used to narrow an overall set or universe of observed probabilities from consideration, thereby enabling only the most likely interactions which may result in a change in state from a first state to a second state to be considered.

Figure 6:
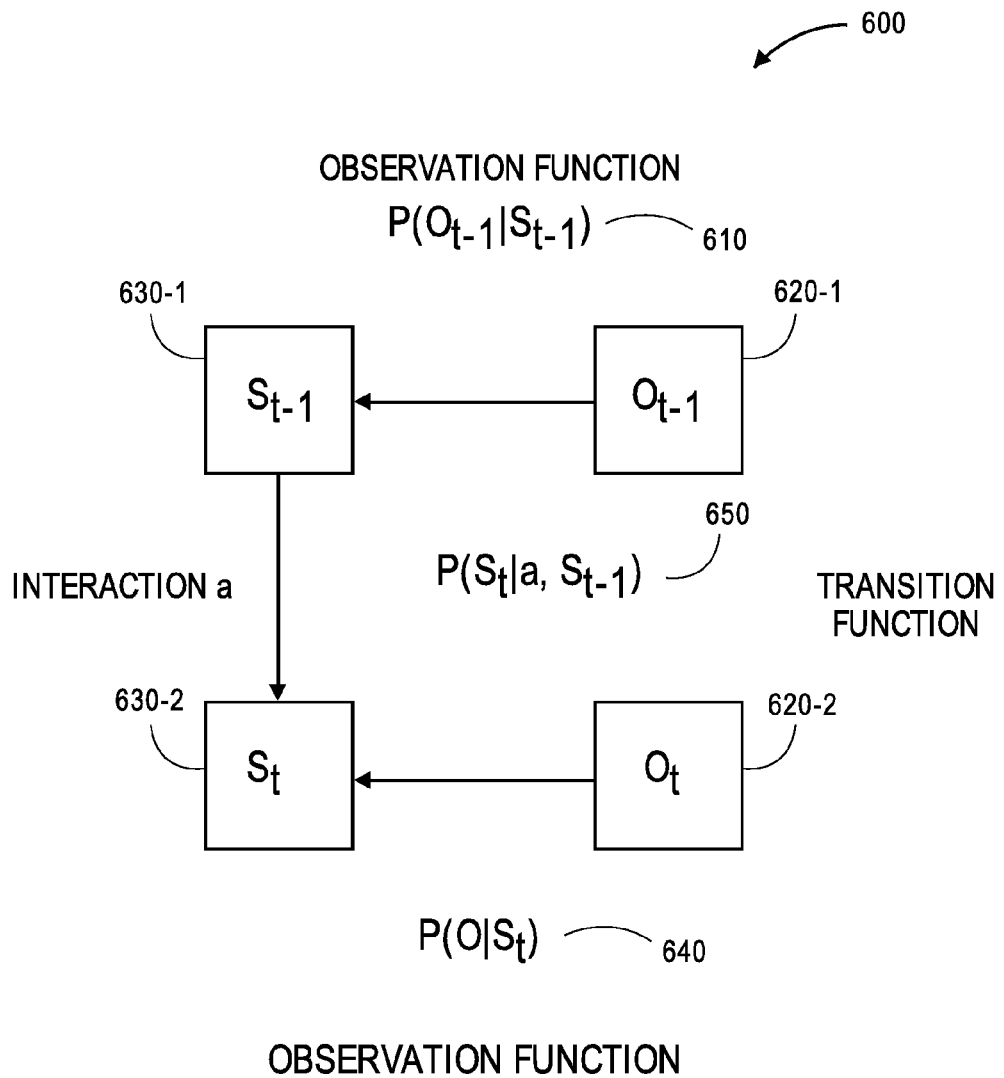
FIG. 6 is a view of aspects of one system for probabilistically registering interactions, actions or activities in accordance with embodiments of the present disclosure.

In accordance with the present disclosure, a combination of the observation functions and the transition functions may be used to identify a most likely interaction that resulted in a change in a state observed by one or more of a plurality of imaging devices. Referring to FIG. 6, aspects of one system 600 for probabilistically registering interactions, actions or activities in accordance with embodiments of the present disclosure are shown. The system 600 considers the observation of a first state at time t−1, viz., the observation $O_{t-1}$ of the state $S_{t-1}$, by two or more imaging devices, and the observation of a second state at time t, viz., the observation $O_t$ of the state $S_t$, by the two or more imaging devices. The observation of the first state is determined according to a first observation function 610, viz., $P(O_{t-1}|S_{t-1})$, which may be used to calculate a probability that the observation $O_{t-1}$ includes the first state $S_{t-1}$. The observation of the second state is determined according to a second observation function 640, viz., $P(O_t|S_t)$, which may be used to calculate a probability that the observation $O_t$ includes the second state $S_t$. As is discussed above, the first observation function 610 and the second observation function 640 may be defined using labeled imaging data, based on known sets of actions or states expressed therein.

Subsequently, based on the first state $S_{t-1}$ and the second state $S_t$, as identified by the two or more imaging devices, an interaction a which resulted in the change from the first state $S_{t-1}$ to the second state $S_t$ may be identified according to the transition function. Specifically, as is discussed above with regard to the system 500 of FIG. 5, the interaction a is identified as corresponding to the second state $S_t$ with the highest probability given the first state $S_{t-1}$.

Figure 7:
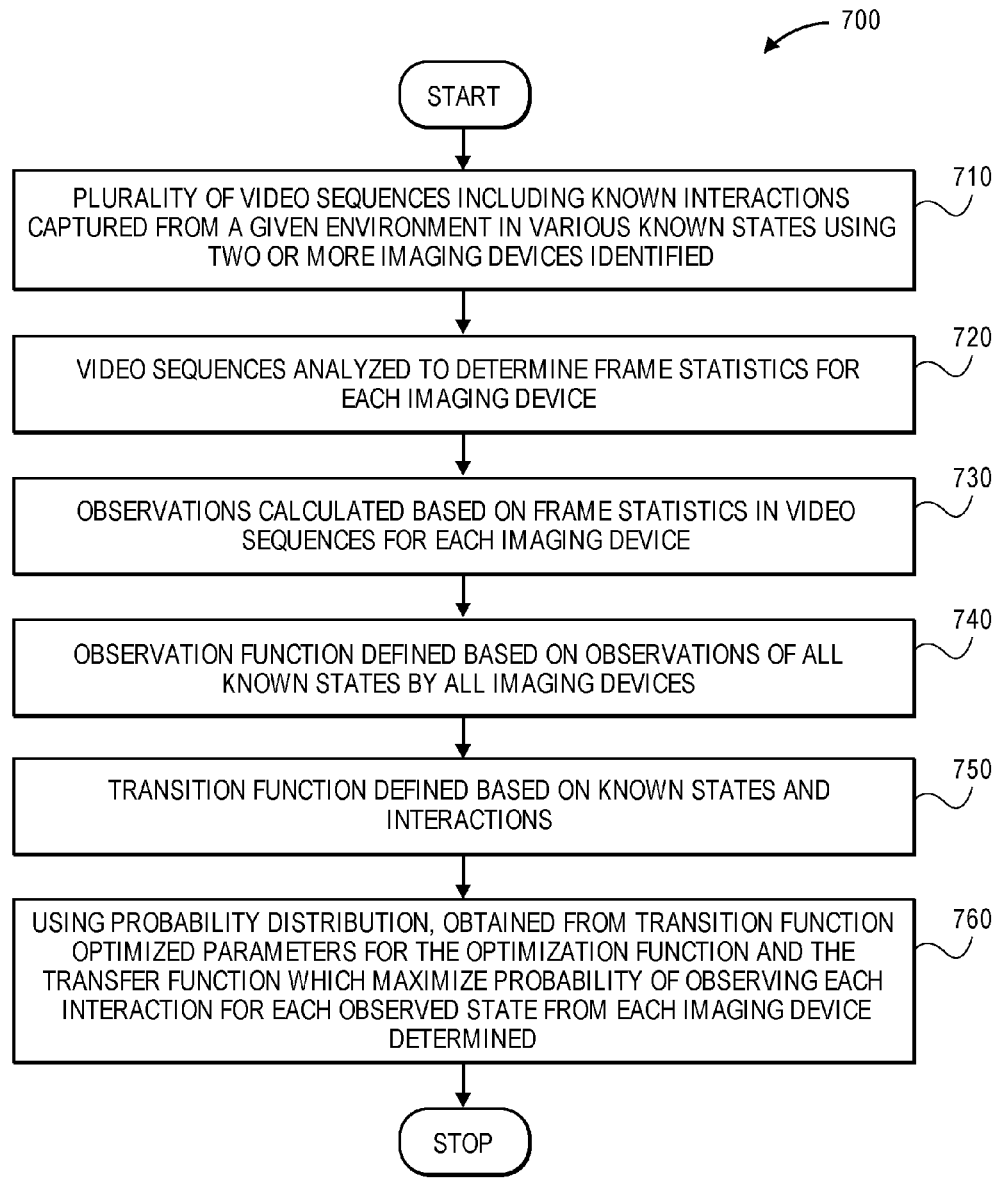
FIG. 7 is a flow chart of one process for probabilistically registering interactions, actions or activities in accordance with embodiments of the present disclosure.

As is discussed above, the observation function and the transition function may be determined using one or more Bayesian classifiers trained with labeled sequences of imaging data comprising one or more clips of still or moving video imagery and/or data captured from two or more imaging devices, and sets of states or interactions expressed therein. Referring to FIG. 7, a flow chart 700 representing one embodiment of a process for probabilistically registering interactions, actions or activities in accordance with embodiments of the present disclosure is shown. At box 710, a plurality of video sequences including known interactions captured from a given environment in various known states using two or more imaging devices is identified. At box 720, the video sequences are analyzed to determine frame statis-tics for each of the imaging devices. The frame statistics may be determined by recognizing one or more groups of colored pixels within still or moving video images, or by identifying edges, contours or outlines of objects within such images, or textures or features of such objects, and correlating such statistics with information regarding a set of interactions, actions or activities known to have occurred or be expressed within such images, which may be stored in one or more data stores.

At box 730, observations may be calculated based on the frame statistics in the video sequences for each of the imaging devices. The observations may be defined as probabilistic representations that a given state is observed in each of the video sequences, based on the frame statistics determined at box 720. At box 740, an observation function is defined based on the observations for all known states and by all of the imaging devices from which the video sequences were captured. The observation function may be a formula for calculating a probability that an environment is observed in a given state, or $P(O|S)$, by one or both of the imaging devices, using initial parameter values obtained from the labeled training data. The observation function effectively represents the probabilities that states of an environment are visible in particular regions within a field of view of an imaging device. Because the observation function considers the fields of view of multiple imaging devices, rather than a single imaging device, the likelihood that an environment will be captured in a given state is enhanced.

At box 750, a transition function is defined based on the known states and the known interactions. As is discussed above, the transition function is representative of a probability that an environment will be in a subsequent state, given a present state of the environment and a particular interaction, as determined from the frame statistics obtained from the video sequences. At box 760, using probability distributions obtained from the transition function, optimized parameters for the observation function and the transition function that maximize a probability of observing each interaction for each observed state from each of the imaging devices are determined, and the process ends. The optimized parameters may be used to increase the probability that the most likely cause of a change in the visual features observed across all views is recognized. More specifically, the optimized parameters enhance the likelihood that an interaction which best and most comprehensively explains a difference between a first set of visual features and a second set of visual features, observed from two or more imaging devices, is selected.

The systems and methods disclosed herein may be incorporated in any number of situations or environments in which the registration of one or more interactions, actions or activities is desired. For example, two or more cameras may be provided at a register or checkout location in a retail or borrowing environment (e.g., a library), and may either augment or replace computer-based systems having scanners, keyboards or keypads for counting or verifying items to be purchased or checked out. One or more of the systems and methods of the present disclosure may confirm a number of times that a particular item is scanned (or whether the item is scanned at all) after being removed from a cart or a basket and placed into a carrying bag. Additionally, one or more of the systems and methods disclosed herein may be provided in a parking facility or automobile or bicycle rental location, e.g., with two or more cameras that may effectively register arrivals or departures of vehicles or bicycles without making contact with the vehicles or bicycles, or the operators thereof. Likewise, a locker storage facility may be fully automated with the use of two or more cameras to acknowledge and register the arrival or retrieval of items therein.

Moreover, in addition to monitoring interactions, actions or activities associated with the purchase, rental or borrowing of items, the systems and methods disclosed herein may be further utilized in the placement of inventory within one or more storage areas or facilities. For example, two or more cameras may be provided and configured to capture the stocking of shelves or the loading of containers within a retail environment such as a department store or grocery store, or the returning of books to shelves within library. Also, a common carrier may provide two or more cameras to automatically register the retrieval of items from delivery stations or post offices by one or more workers or customers, and obviate the use of passwords, passcodes or other authenticators. Similarly, two or more cameras may be provided to monitor shelves or other storage locations for security purposes, e.g., to detect and register the removal of items therefrom that are not anticipated by a computer-based order fulfillment system.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of digital cameras posted in fulfillment centers for security purposes, the systems and methods disclosed herein are not so limited, and may be utilized along with any type of imaging device applied in any environment and for any purpose. Furthermore, although some of the embodiments shown or described herein utilize two imaging devices (e.g., two digital cameras), those of ordinary skill in the pertinent arts will recognize that the systems and methods of the present disclosure may utilize multiple imaging devices in any number. Additionally, those skilled in the pertinent arts will recognize that the systems and methods disclosed herein are not limited to a single form of machine learning system or classifier, e.g., a Bayesian classifier or model. Rather, any form of machine learning system or classifier, or any number of such systems or classifiers, may be provided in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system for monitoring an environment comprising:
    a plurality of digital cameras, wherein the plurality of digital cameras includes a first digital camera having a first orientation with respect to the environment and a second digital camera having a second orientation with respect to the environment; and
    a computing device having at least one computer processor and at least one memory, wherein the computing device is in communication with at least the first digital camera and the second digital camera,
    wherein the computing device is configured to at least:
        cause the first digital camera to capture a first digital image at a first time;
        cause the second digital camera to capture a second digital image at the first time;
        determine, according to a first function, a first probability that the environment is in a first state at the first time based at least in part on the first digital image and the second digital image;
        cause the first digital camera to capture a third digital image at a second time;
        cause the second digital camera to capture a fourth digital image at the second time;
        determine, according to the first function, a second probability that the environment is in a second state at the second time based at least in part on the third digital image and the fourth digital image; and
        select, according to a second function, an interaction associated with a change from the first state to the second state based at least in part on the first probability and the second probability.

2. The system of claim 1, wherein the computing device is further configured to at least:
    identify a training set of imaging data, wherein the training set of imaging data comprises a plurality of digital images, and wherein each of the digital images is labeled with at least one of a plurality of states or at least one of a plurality of interactions.

3. The system of claim 2, wherein the computing device is further configured to at least:
    derive at least one of the first function or the second function based at least in part on the training set of imaging data.

4. A computer-implemented method comprising:
    determining, according to a first function, a first probability that a first state of an environment is expressed in at least one of a first image of a portion of the environment or a second image of the portion of the environment, wherein the first image is captured in a first field of view of a first imaging device at a first time, and wherein the second image is captured in a second field of view of a second imaging device at the first time; and
    identifying, according to a second function, a first interaction with the environment associated with at least the first state, wherein the second function is configured to determine one of a plurality of interactions associated with changes from one of a plurality of states of the environment to another of the plurality of states of the environment.

5. The computer-implemented method of claim 4, further comprising:
    causing the first imaging device to capture the first image at the first time;
    causing the second imaging device to capture the second image at the first time;
    receiving, from the first imaging device, the first image over a network; and
    receiving, from the second imaging device, the second image over the network,
    wherein the first probability is determined upon receiving at least one of the first image or the second image.

6. The computer-implemented method of claim 5, further comprising:
    determining a second state of the environment at a second time, wherein the second time precedes the first time.

7. The computer-implemented method of claim 6, wherein determining the second state of the environment at the second time further comprises:
    causing the first imaging device to capture a third image of the portion of the environment in the first field of view of the first imaging device at the second time;
    causing the second imaging device to capture a fourth image of the portion of the environment in the second field of view of the second imaging device at the second time; and
    determining, according to the first function, a second probability that the second state of the environment is expressed in at least one of the third image or the fourth image.

8. The computer-implemented method of claim 7, wherein the first interaction is the one of the plurality of interactions corresponding to a highest probability of a change from the second state to the first state.

9. The computer-implemented method of claim 4,
    digitally transforming the first image to an image patch according to a geometrical transform; and
    digitally transforming the second image to the image patch according to the geometrical transform,
    wherein the image patch comprises a fixed set of dimensions.

10. The computer-implemented method of claim 4, further comprising:
    identifying a plurality of training images captured using at least the first imaging device and the second imaging device, wherein each of the plurality of training images corresponds to at least one of the plurality of interactions or at least one of the plurality of states of the environment; and
    deriving the second function based at least in part on the plurality of training images.

11. The computer-implemented method of claim 4, wherein the first function is configured to determine probabilities that one of the plurality of states of the environment is shown in images captured using at least one of the first imaging device or the second imaging device.

12. The computer-implemented method of claim 11, further comprising:
    identifying a plurality of training images captured using at least the first imaging device and the second imaging device, wherein each of the plurality of training images corresponds to at least one of the plurality of interactions or at least one of the plurality of states of the environment; and
    deriving the first function based at least in part on the plurality of training images.

13. The computer-implemented method of claim 4, wherein the first function is configured to determine a sum of at least:
  a first product of (i) a conditional probability of an observation of the first state using the first imaging device given the first state and an observation of the first state using the second imaging device and (ii) a probability of the observation of the first state using the second imaging device; and
  a second product of (i) a conditional probability of the observation of the first state using the second imaging device given the first state and the observation of the first state using the first imaging device and (ii) a probability of the observation of the first state using the first imaging device.

14. The computer-implemented method of claim 4, wherein determining the first probability that the first state of the environment is expressed in the at least one of the first image or the second image according to the first function further comprises:
  identifying at least one visual feature expressed in the first image; and
  determining that the at least one visual feature is associated with the first state, wherein the at least one visual feature is at least one of:
  at least one color histogram; or
  at least one histogram of oriented gradients.

15. The computer-implemented method of claim 4, wherein determining the first probability that the first state of the environment is expressed in the at least one of the first image or the second image according to the first function further comprises:
  recognizing at least one of an edge, a contour, an outline, a texture or a feature of an object in the first image; and
  determining that the at least one of the edge, the contour, the outline, the texture or the feature of the object is associated with the first state.

16. The computer-implemented method of claim 4,
  wherein the portion of the environment comprises at least one storage area,
  wherein the first field of view includes a substantially fronto-parallel view of a front face of the at least one storage area,
  wherein the second field of view includes a substantially oblique view of the front face of the at least one storage area, and
  wherein the first state is at least one of:
    at least one item being present in the at least one storage area; or
    the at least one item being not present in the at least one storage area.

17. A system comprising:
  a computer device having at least one computer processor and at least one memory component;
  a first imaging device in communication with the computer device, wherein the first imaging device is aligned at a first orientation with respect to a portion of an environment; and
  a second imaging device in communication with the computer device, wherein the second imaging device is aligned at a second orientation with respect to the portion of the environment,
  wherein the computer device is configured to at least:
    determine a first state of at least the portion of the environment at a first time;
    receive, from the first imaging device, a first image of at least the portion of the environment, wherein the first image is captured by the first imaging device at a second time, and wherein the second time follows the first time;
    receive, from the second imaging device, a second image of at least the portion of the environment, wherein the second image is captured by the second imaging device at the second time;
    determine a first probability of at least a second state of the environment according to a first probability function, wherein the first probability is determined based at least in part on at least one of the first image or the second image; and
    determine that an interaction with the environment has occurred based at least in part on the first state and the first probability.

18. The system of claim 17, wherein the interaction with the environment is determined to have occurred according to a second probability function, and
  wherein the computer device is further configured to at least:
  define the first probability function for determining one of a plurality of states of at least the portion of the environment based at least in part on a training set of imaging data, wherein the first probability function is configured to determine probabilities of states of environments based at least in part on images captured using at least one of the first imaging device or the second imaging device; and
  define the second probability function associated with at least the first state based at least in part on the training set of imaging data, wherein the second probability function is configured to determine probabilities of relationships between the states of the environments and interactions with the environments.

19. The system of claim 18, wherein the computer device is further configured to at least:
  identify a training set of imaging data of at least the portion of the environment, wherein the training set comprises a plurality of images captured using at least one of the first imaging device or the second imaging device prior to the first time and a plurality of identifiers, and wherein each of the identifiers corresponds to at least one of a state of the environment or an interaction with the environment expressed in one of the images; and
  analyze the training set of imaging data to identify at least one color histogram corresponding to at least the first state of at least the portion of the environment.

20. The system of claim 17, wherein the first orientation is a substantially fronto-parallel orientation with respect to the portion of the environment, and
  wherein the second orientation is a substantially oblique orientation with respect to the portion of the environment.

* * * * *